(12) United States Patent
Agarwal et al.

(10) Patent No.: US 9,185,049 B2
(45) Date of Patent: Nov. 10, 2015

(54) TECHNIQUES FOR SIMPLIFYING STACKING TRUNK CREATION AND MANAGEMENT

(71) Applicant: Brocade Communications Systems, Inc., San Jose, CA (US)

(72) Inventors: Bipin Agarwal, San Jose, CA (US); Kwun-Nan Kevin Lin, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 68 days.

(21) Appl. No.: 14/268,507

(22) Filed: May 2, 2014

(65) Prior Publication Data

US 2015/0117263 A1    Apr. 30, 2015

Related U.S. Application Data

(60) Provisional application No. 61/898,295, filed on Oct. 31, 2013.

(51) Int. Cl.
  *H04L 12/933* (2013.01)
  *H04L 12/931* (2013.01)
(52) U.S. Cl.
  CPC ............... *H04L 49/15* (2013.01); *H04L 49/65* (2013.01)
(58) Field of Classification Search
  CPC ............................... H04L 49/15; H04L 49/65
  See application file for complete search history.

(56) References Cited

U.S. PATENT DOCUMENTS

| | | | |
|---|---|---|---|
| 5,481,073 A | 1/1996 | Singer et al. | |
| 5,651,003 A | 7/1997 | Pearce et al. | |
| 6,366,582 B1 * | 4/2002 | Nishikado et al. | 370/401 |
| 6,373,840 B1 | 4/2002 | Chen | |
| 6,490,276 B1 | 12/2002 | Salett et al. | |
| 6,496,502 B1 | 12/2002 | Fite, Jr. et al. | |
| 6,516,345 B1 | 2/2003 | Kracht | |
| 6,526,345 B2 | 2/2003 | Ryoo | |
| 6,597,658 B1 | 7/2003 | Simmons | |
| 6,765,877 B1 | 7/2004 | Foschiano et al. | |
| 6,807,182 B1 * | 10/2004 | Dolphin et al. | 370/401 |
| 6,839,342 B1 | 1/2005 | Parham et al. | |
| 6,839,349 B2 | 1/2005 | Ambe et al. | |
| 7,099,315 B2 | 8/2006 | Ambe et al. | |
| 7,106,736 B2 | 9/2006 | Kalkunte | |

(Continued)

FOREIGN PATENT DOCUMENTS

WO    2015026950 A1    2/2015

OTHER PUBLICATIONS

Appeal Brief Dated Jan. 18, 2013; U.S. Appl. No. 12/463,964 (23p.)

(Continued)

*Primary Examiner* — Andrew Lai
*Assistant Examiner* — Chuong M Nguyen
(74) *Attorney, Agent, or Firm* — Fountainhead Law Group P.C.

(57) ABSTRACT

Techniques for simplifying stacking trunk creation and management are provided. In one embodiment, a switch in a stacking system can receive first and second control packets from one or more other switches in the stacking system, where the first and second control packets are received on first and second stacking ports of the switch respectively. The switch can then determine, based on the first and second control packets, whether the first and second stacking ports can be configured as a single stacking trunk.

19 Claims, 6 Drawing Sheets

(56) References Cited

U.S. PATENT DOCUMENTS

| | | | |
|---|---|---|---|
| 7,136,289 | B2 | 11/2006 | Vasavda et al. |
| 7,184,441 | B1 | 2/2007 | Kadambi et al. |
| 7,206,283 | B2 | 4/2007 | Chang et al. |
| 7,274,694 | B1 | 9/2007 | Cheng et al. |
| 7,336,622 | B1 | 2/2008 | Fallis et al. |
| 7,426,179 | B1 | 9/2008 | Harshavardhana et al. |
| 7,480,258 | B1 | 1/2009 | Shuen et al. |
| 7,496,096 | B1 | 2/2009 | Dong et al. |
| 7,523,227 | B1 | 4/2009 | Yager et al. |
| 7,697,419 | B1 | 4/2010 | Donthi |
| 8,209,457 | B2 | 6/2012 | Engel et al. |
| 9,032,057 | B2 | 5/2015 | Agarwal et al. |
| 2001/0042062 | A1* | 11/2001 | Tenev et al. .................. 707/3 |
| 2002/0046271 | A1 | 4/2002 | Huang |
| 2003/0005149 | A1 | 1/2003 | Haas et al. |
| 2003/0169734 | A1* | 9/2003 | Lu et al. .................. 370/386 |
| 2003/0188065 | A1* | 10/2003 | Golla et al. .................. 710/243 |
| 2005/0063354 | A1 | 3/2005 | Garnett et al. |
| 2005/0271044 | A1 | 12/2005 | Hsu et al. |
| 2006/0013212 | A1 | 1/2006 | Singh et al. |
| 2006/0023640 | A1 | 2/2006 | Chang et al. |
| 2006/0072571 | A1 | 4/2006 | Navada et al. |
| 2006/0077910 | A1 | 4/2006 | Lundin et al. |
| 2006/0092853 | A1 | 5/2006 | Santoso et al. |
| 2006/0187900 | A1 | 8/2006 | Akbar |
| 2006/0253557 | A1 | 11/2006 | Talayco et al. |
| 2007/0081463 | A1 | 4/2007 | Bohra et al. |
| 2008/0137530 | A1 | 6/2008 | Fallis et al. |
| 2008/0281947 | A1 | 11/2008 | Kumar |
| 2009/0125617 | A1 | 5/2009 | Klessig et al. |
| 2009/0135715 | A1 | 5/2009 | Bennah |
| 2010/0172365 | A1 | 7/2010 | Baird et al. |
| 2010/0257283 | A1 | 10/2010 | Agarwal |
| 2010/0284414 | A1 | 11/2010 | Agarwal et al. |
| 2011/0238923 | A1 | 9/2011 | Hooker et al. |
| 2013/0215791 | A1 | 8/2013 | Lin et al. |
| 2013/0232193 | A1 | 9/2013 | Ali et al. |
| 2013/0262377 | A1 | 10/2013 | Agarwal |
| 2014/0126354 | A1 | 5/2014 | Hui et al. |
| 2014/0181275 | A1 | 6/2014 | Lin et al. |
| 2014/0269402 | A1* | 9/2014 | Vasseur et al. .................. 370/253 |
| 2014/0334494 | A1 | 11/2014 | Lin et al. |
| 2014/0341079 | A1 | 11/2014 | Lin et al. |
| 2014/0341080 | A1 | 11/2014 | Lin et al. |
| 2014/0376361 | A1 | 12/2014 | Hui et al. |
| 2015/0055452 | A1 | 2/2015 | Lee |
| 2015/0229565 | A1 | 8/2015 | Ravipati et al. |

OTHER PUBLICATIONS

Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 08.0.00; Apr. 30, 2013; 212 pages.
Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiner's Answer Dated May 7, 2013; U.S. Appl. No. 12/463,964 (2120-4200) (12 p.).
Extreme Networks Technical Brief: "SummitStack Stacking Technology"; 1346_06; Dec. 10; 8 pages.
Final Office Action Dated Jan. 23, 2012; U.S. Appl. No. 12/463,964 (2120-04200) (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (12 p.).
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 P.).
Partial International Search Report for PCT/US2014/051903 dated Nov. 18, 2014.
Reply Brief Dated Jul. 8, 2013; U.S. Appl. No. 12/463,964 (14 p.).
Response to Office Action Dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/094,931, filed Dec. 3, 2013 by Lin et al.
U.S. Appl. No. 14/106,302, filed Dec. 13, 2013 by Lin et al.
U.S. Appl. No. 14/171,152, filed Feb. 3, 2014 by Lin et al.
U.S. Appl. No. 14/207,146, filed Mar. 12, 2014 by Lin et al.
U.S. Appl. No. 14/463,419, filed Aug. 19, 2014 by Lee (Unpublished).
U.S. Appl. No. 14/485,343, filed Sep. 12, 2014 by Lin et al. (Unpublished).
U.S. Appl. No. 14/506,943, filed Oct. 6, 2014 by Lin et al. (Unpublished).
U.S. Appl. No. 14/530,193, filed Oct. 31, 2014 by Ravipati et al. (Unpublished).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
International Search Report and Written Opinion for International Appln. No. PCT/US2014/051903 dated Jan. 27, 2015, 16 pages.
Final Office Action Dated Feb. 13, 2015; U.S. Appl. No. 13/850,118; (14 p.).
Amendment to Carrier Multiple Access with Collision Detection (CSMA/CD) Access Method and Physical Layer Specifications—Aggregation of Multiple Link Segments; IEEE Std. 802.3ad; 2000; 183 pages.
Configure, Verify, and Debug Link Aggregation Control Program (LACP); Allied Telesyn; 2004; 10 pages.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
Office Action Dated Jul. 16, 2015; U.S. Appl. No. 14/094,931; (41 pgs.).

(56) References Cited

OTHER PUBLICATIONS

Notice of Allowance dated Aug. 3, 2015; U.S. Appl. No. 14/207,146 (38 pgs.).
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Extended European Search Report dated Jul. 30, 2015 for EP Appln. 15000834.0; 8 pages.

* cited by examiner

TECHNIQUES FOR SIMPLIFYING STACKING TRUNK CREATION AND MANAGEMENT

CROSS REFERENCES TO RELATED APPLICATIONS

The present application claims the benefit and priority under 35 U.S.C. 119(e) of U.S. Provisional Application No. 61/898,295, filed Oct. 31, 2013, entitled "TECHNIQUES FOR SIMPLIFYING STACKING TRUNK CREATION AND MANAGEMENT," the entire contents of which are incorporated herein by reference for all purposes.

BACKGROUND

Figure 1A:
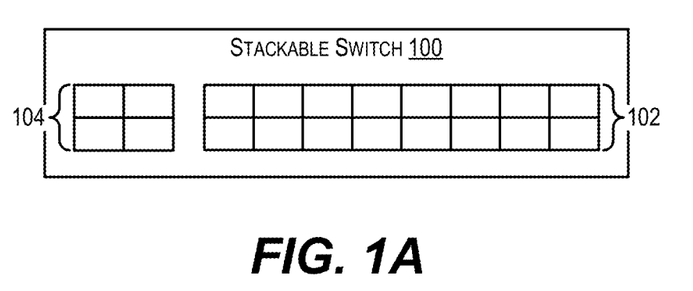
FIG. 1A depicts a stackable switch according to an embodiment.

As known in the art, a "stackable switch" is a network switch that can operate independently as a standalone device or in concert with one or more other stackable switches in a "stack" or "stacking system." FIG. 1A illustrates the front face of an exemplary stackable switch 100 according to an embodiment. As shown in FIG. 1A, stackable switch 100 includes a plurality of data ports 102 that are operable for connecting switch 100 to one or more hosts and/or data networks. Stackable switch 100 also includes a set of stacking ports 104 that are operable for linking switch 100 to other switch units in a stacking configuration. Stacking ports 104 can be dedicated ports (i.e., ports designed specifically for stacking) or high bandwidth data uplink ports that can operate in a stacking mode.

Figure 1B:
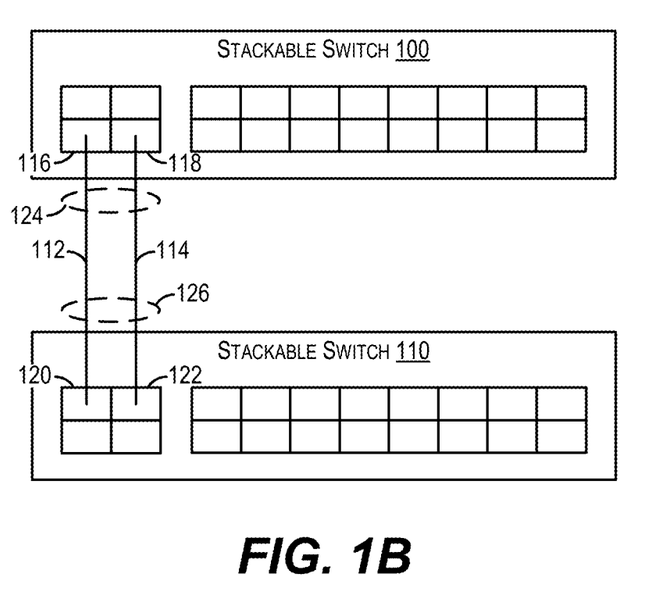
FIG. 1B depicts a stacking system according to an embodiment.

Some stackable switches support a feature known as "trunked stacking." With this feature, multiple stacking ports can be grouped together to behave as a single logical port (referred to as a "stacking trunk"), thereby improving resiliency and bandwidth between units in a stacking system. By way of example, FIG. 1B depicts a stacking system where stackable switch 100 of FIG. 1A is connected to another stackable switch 110 via links 112 and 114. The stacking ports at the ends of these links (i.e., ports 116, 118 on switch 100 and ports 120, 122 on switch 110) are grouped into stacking trunks 124 and 126 respectively. In this example, when traffic needs to flow between switches 100 and 110, the traffic may pass over either link 112 or 114 since they are considered part of the same logical connection. This increases the aggregate bandwidth between switches 100 and 110 and provides redundancy in the case of a link failure.

Unfortunately, despite the advantages provided by trunked stacking, this feature can also significantly complicate stacking system administration and management. For instance, in order to configure stacking trunks 124 and 126 shown in FIG. 1B, a system administrator must typically enter trunk creation commands at each switch 100 and 110, which require knowledge of the unit IDs of the switches, the port numbers of the trunked ports, and the format/operation of the commands themselves. Although this manual configuration process may be workable in a small-scale stacking system, it can quickly become cumbersome, time-consuming, and error-prone in systems with larger and/or more complex topologies.

Further, the physical connections between units in a stacking system must correctly match the configuration entered via the trunk commands. If one or more of the physical connections are incorrect, the system administrator must generally inspect the cabling at each unit in order to find the incorrect connection(s), which again can be very difficult and time-consuming in a large/complex topology.

SUMMARY

Techniques for simplifying stacking trunk creation and management are provided. In one embodiment, a switch in a stacking system can receive first and second control packets from one or more other switches in the stacking system, where the first and second control packets are received on first and second stacking ports of the switch respectively. The switch can then determine, based on the first and second control packets, whether the first and second stacking ports can be configured as a single stacking trunk.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for simplifying the creation and management of stacking trunks in a stacking system. In one set of embodiments, the physical topology of the stacking system can be discovered and stacking trunks can be created/configured automatically based on the discovered topology, thus eliminating the need for any manual trunk configuration.

In another set of embodiments, the discovered topology can be analyzed and erroneous physical connections between switches (e.g., links that do not allow for a valid trunk) can be determined. The location of the erroneous connections (e.g., unit ID/MAC address and port number) can then be reported to the system administrator so that he/she can adjust the cabling at the affected units, without having to inspect each and every unit in the stacking system.

In yet another set of embodiments, the techniques described herein can automatically make changes/corrections to an existing trunk configuration in view of the discovered topology. For example, consider a situation where stacking trunks are created/configured and the physical topology of the stacking system subsequently changes, thereby rendering the existing configuration obsolete. In this case, the errors in the existing configuration can be identified and automatically corrected. In scenarios where there is a non-critical conflict between the physical topology and the trunking configuration, certain rules may be applied to determine whether the configuration should be changed in view of the topology or left intact.

2. Exemplary Stacking System

Figure 2:
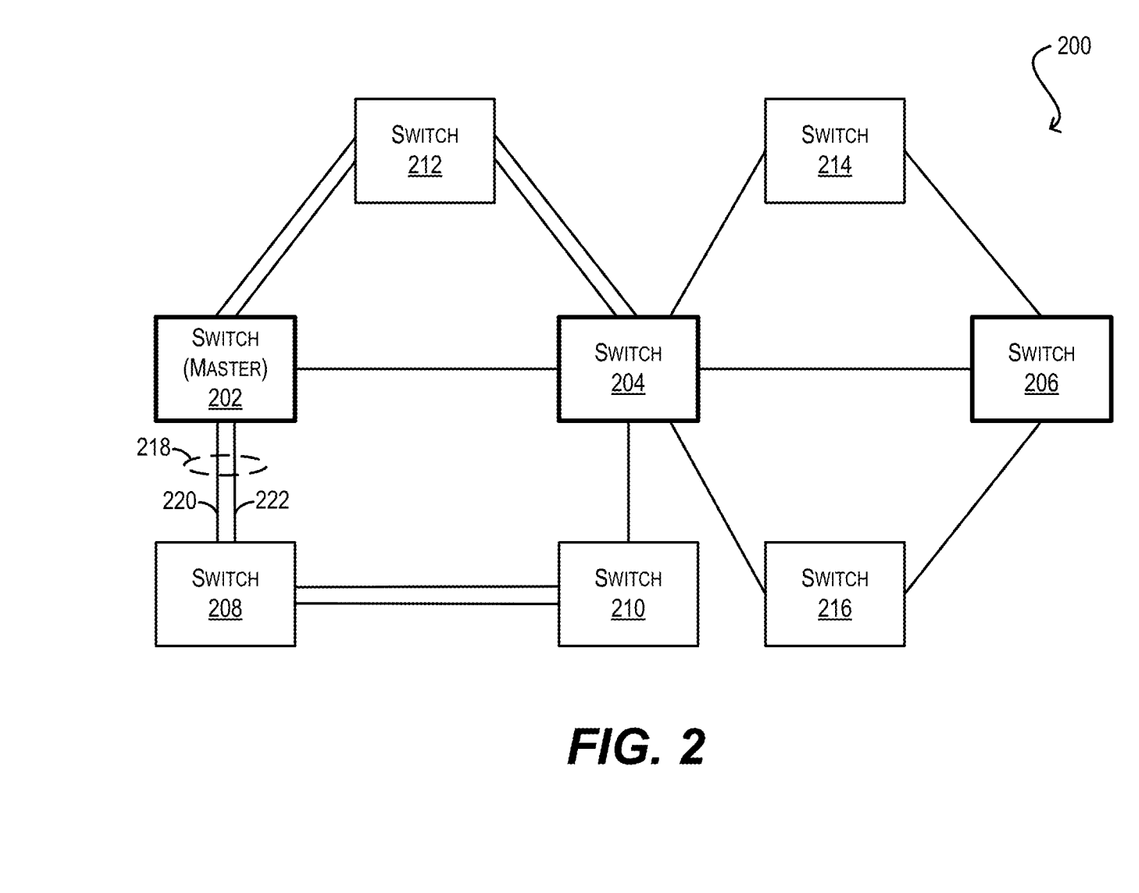
FIG. 2 depicts another stacking system according to an embodiment.

To provide context for the embodiments described herein, FIG. 2 depicts an exemplary stacking system 200 according to an embodiment. As shown, stacking system 200 comprises a number of stackable switches 202-216 connected in a mesh-like topology. Stackable switch 202 is designated as the "master" unit of stacking system 200, which means that switch 202 serves as the point of user contact for all management functions of system 200. For instance, stackable switch 202 can accept and process user commands directed to the overall configuration of stacking system 200. Stackable switch 202 can also communicate with non-master units 204-216 in order to send/receive various types of management commands and data to/from those units as needed.

In the example of FIG. 2, switches 202, 204, and 206 are "core" units (indicated by the heavy outline) and switches 208, 210, 212, 214, and 216 are "peripheral" units (indicated by the lighter outline). In various embodiments, core units 202-206 can have more and/or superior capabilities than peripheral units 208-216. For instance, in a particular embodiment, core units 202-206 can have higher bandwidth data and/or stacking ports than peripheral units 208-216. Thus, the links directly interconnecting the core units can support a greater data throughout than the links interconnecting the peripheral units with each other (or with the core units). Alternatively, core units 202-206 can have other characteristics that distinguish these units from peripheral units 208-216 (e.g., a larger number of ports, more advanced network processing capabilities, a higher level of security clearance, etc.).

Further, in FIG. 2, some of the switches are interconnected via stacking trunks, rather than individual stacking links. For example, switches 202 and 208 are interconnected via a stacking trunk 218 comprising links 220 and 222. With these stacking trunks, greater throughput and resiliency can be achieved in the stacking system.

As noted in the Background section, one difficulty with managing a complex stacking system such as stacking system 200 of FIG. 2 involves configuring and maintaining the stacking trunks between switch units. Currently, system administrators handle this task by manually entering trunk creation commands at each switch that is an endpoint for a stacking trunk. However, this manual process can be burdensome, time-consuming, and error prone. Further, in scenarios where the physical connections in the stacking system do not match the manually-entered commands, there is no way for the administrators to easily determine which physical connections are incorrect. As a result, the administrators must manually inspect the cabling at each switch unit to resolve this type of problem.

To address the foregoing and other similar issues, embodiments of the present invention provide techniques for (1) automatically creating/configuring stacking trunks in a stacking system based on the system's physical topology; (2) automatically detecting and identifying incorrect physical connections; and (3) automatically modifying/correcting existing trunking configurations in view of topology changes. With these techniques (which are described in the sections that follow), many of the inefficiencies and burdens associated with manual stacking trunk configuration/management can be minimized or eliminated.

3. Automated Trunk Creation

Figure 3:
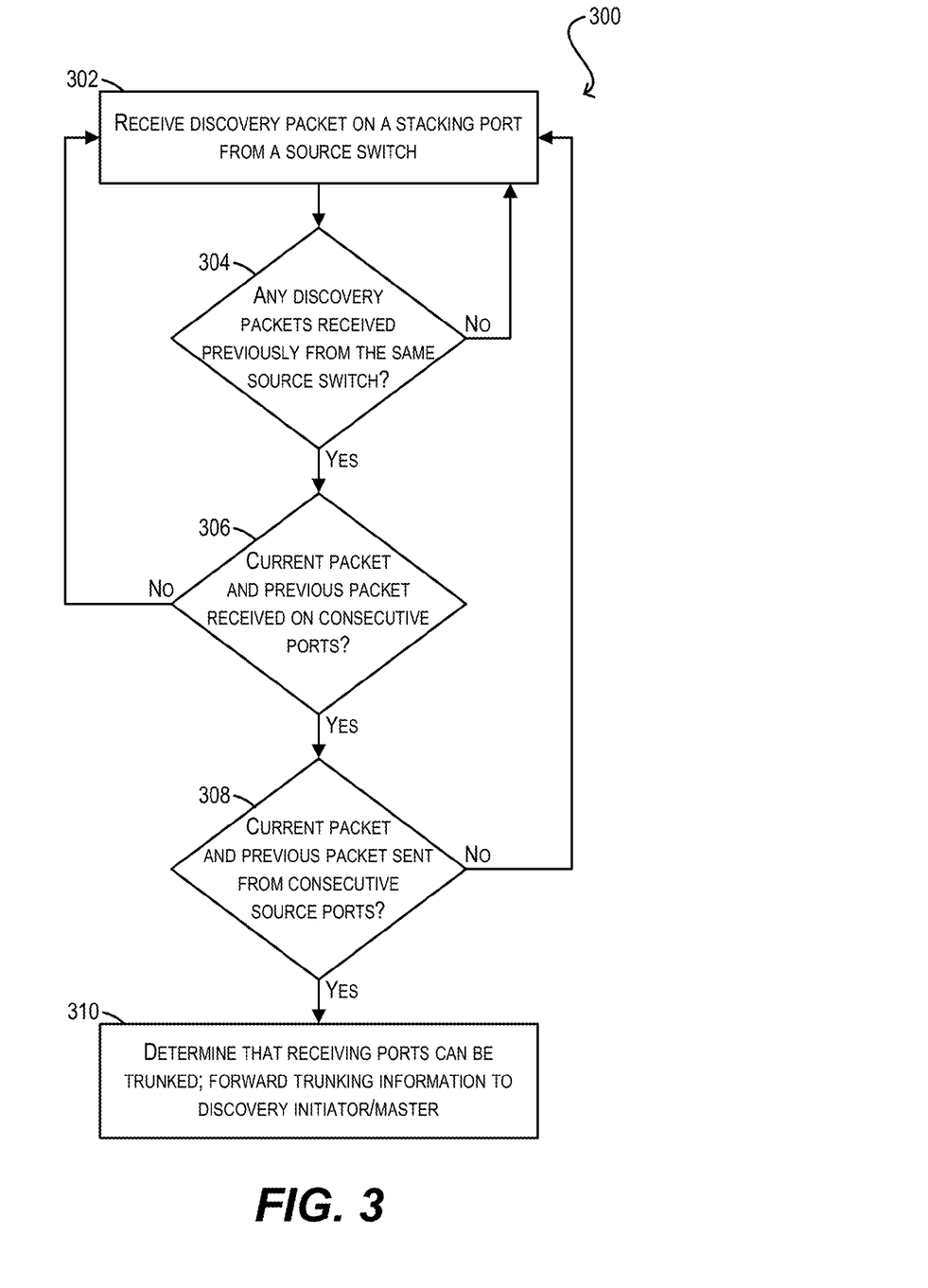
FIG. 3 depicts a flowchart for automatically creating stacking trunks according to an embodiment.

FIG. 3 depicts a flowchart 300 for automatically creating/configuring trunks for a stacking system according to an embodiment. Flowchart 300 assumes that each switch in the stacking system floods, on all of its outgoing stacking ports (with certain restrictions as noted below), control packets for the purpose of discovering the physical topology of the system. These control packets are referred to herein as "discovery packets." The discovery packets are propagated throughout the stacking system and processed at each receiving switch in the manner shown in flowchart 300 to automatically identify and create stacking trunks.

At block 302, the receiving switch can receive a discovery packet on a stacking port from a given source switch in the stacking system. In response, the receiving switch can check whether a discovery packet was previously received from the same source switch (block 304). If not, flowchart 300 can loop back to block 302.

If the receiving switch did previously receive a discovery packet from the same source switch, the receiving switch can then check whether the ports on which the current discovery packet and the previous discovery packet were received are consecutive ports (i.e., numbered with consecutive port numbers) (block 306). If not, flowchart 300 can loop back to block 302.

On the other hand, if the current and previous discovery packets were received on consecutive ports, the receiving switch can finally check whether the current and previous discovery packets were sent from consecutive source ports (i.e., consecutively numbered ports on the source switch) (block 308). In one embodiment, the receiving switch can determine this by evaluating the content of the discovery packets (which should identify the source port number). If not, flowchart 300 can loop back to block 302. Otherwise, the receiving switch can determine that the ports on which the two discovery packets were received can be trunked, and can forward this information to the master switch in the stacking system (block 310).

Although not shown in FIG. 3, the master switch can subsequently generate appropriate configuration for defining the two receiving ports and the two source ports as stacking trunks, thereby automatically creating/configuring the trunks without any manual intervention from an administrator or other user.

In some cases, there may be more than two stacking links connecting a source and a receiving switch, where the links use consecutive ports on both ends. In these situations, a deterministic rule may be used to determine which subset of the ports will be used to a form a stacking trunk. One such rule is to form a stacking trunk comprising two ports, where the first port of the trunk is an odd numbered port and the second port of the trunk is an even numbered port.

To better clarify the operation of flowchart 300, consider a scenario where switch 202 of FIG. 2 floods discovery packets to its immediately connected neighbors in stacking system 200. In this scenario, switch 208 will receive two discovery packets from switch 202—one packet on link 220 and another packet on link 222. Upon receiving the second discovery packet, switch 208 will determine that the two packets were (1) received from the same source unit (i.e., switch 202); (2) were received on consecutively numbered stacking ports; and (3) were transmitted by switch 202 on consecutively numbered source stacking ports. Accordingly, switch 208 will determine that a stacking trunk can be formed on the receiving (and source) stacking ports, and will transmit trunking information to the master switch (e.g., switch 202) to that effect. Switch 208 can also propagate the discovery packets to other connected switches in the system so that they can perform similar processing to identify and create additional stacking trunks.

One important aspect of the discovery mechanism described with respect to FIG. 3 is that the discovery packets should not loop around the topology; in other words, the discovery packets should reach each unit in the stacking system, but should not return back to the packet initiator. This prevents broadcast storms, which can completely saturate the bandwidth of the stacking links.

To ensure the foregoing behavior, each switch in the stacking system can enforce a number of rules at the point of determining whether to forward a received discovery packet. For instance, in one embodiment, if the switch is a core unit and has received a discovery packet from a peripheral unit, the switch will not propagate the packet any further. The logic for this rule is that the packet has received the "end" of the peripheral sub-stack in the topology.

In a further embodiment, each switch can enforce a rule where, if a port can form a trunk with the port on which the discovery packet is received, the packet is not forwarded on that "trunkable" port.

In yet a further embodiment, each switch can enforce a rule where discovery packets are not forwarded on user data ports.

In yet a further embodiment, each switch can enforce a rule where discovery packets are not forwarded on ports that lead back to the immediate source of the received packets. One exception to this rule is that discovery packets may be forwarded back to a source unit on ports that are different from (and not trunkable with) the port(s) on which the packets were received.

In some embodiments, the administrator of a stacking system may wish to exclude certain physically connected units from the system's "active" topology. In these cases, the administrator can define a policy for pruning one or more stacking links in the topology, and the system can take this policy in account to prevent the propagation of discovery packets across the pruned links.

4. Incorrect Physical Topology Detection/Reporting

Figure 4:
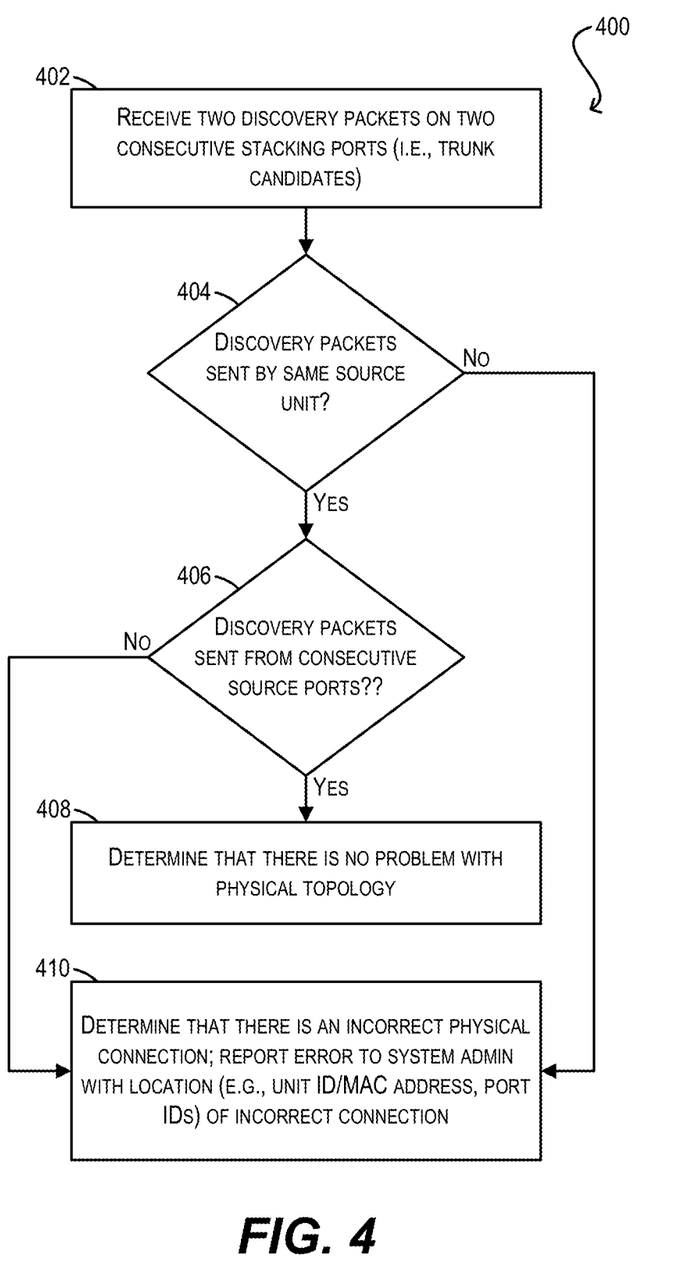
FIG. 4 depicts a flowchart for detecting erroneous physical connections in a stacking system topology according to an embodiment.

In addition to automated trunk creation, the discovery mechanism described above may also be leveraged to automatically detect whether there are any incorrect physical connections in a stacking system topology (i.e., connections that prevent the formation of valid trunks). If one or more incorrect connections are found, the location of the connections can be reported to the system administrator for resolution. FIG. 4 depicts a flowchart 400 of such a detection/reporting process according to an embodiment. It is assumed that flowchart 400 is performed by each switch of the stacking system at the point of receiving a discovery packet. Accordingly, flowchart 400 may be performed at substantially the same time as flowchart 300 of FIG. 3 (i.e., during the same topology discovery process).

At block 402, the receiving switch can receive two discovery packets on two consecutive ports (i.e., the ports are candidates for forming a trunk on the receiving side). In response, the receiving switch can check whether the source unit for the two discovery packets are the same (i.e., did the packets arrive from the same unit?) (block 404). If not, the receiving switch can determine there is likely an incorrect physical connection and can report an error to the system administrator (with information identifying, e.g., the receiving switch's ID and/or MAC address, the source switches' IDs and/or MAC addresses, and the receiving switch port numbers) (block 410). With this information, the system administrator can quick identify the problem and address the issue (by, e.g., rearranging one or more physical cables).

If the source unit for the two discovery packets is the same, the receiving switch can move on to checking whether the source ports for the two packets are consecutive (block 406). As noted with respect to FIG. 3, the receiving switch can determine this by evaluating the content of the discovery packets (which should identify the source port number). If the source ports are not consecutive, the receiving switch can determine that there is a connection error and provide a report to the system administrator as per block 410. Otherwise, the receiving switch can determine that there is no problem with the physical topology (block 408) and flowchart 400 can end.

5. Automated Trunk Configuration Correction

Figure 5:
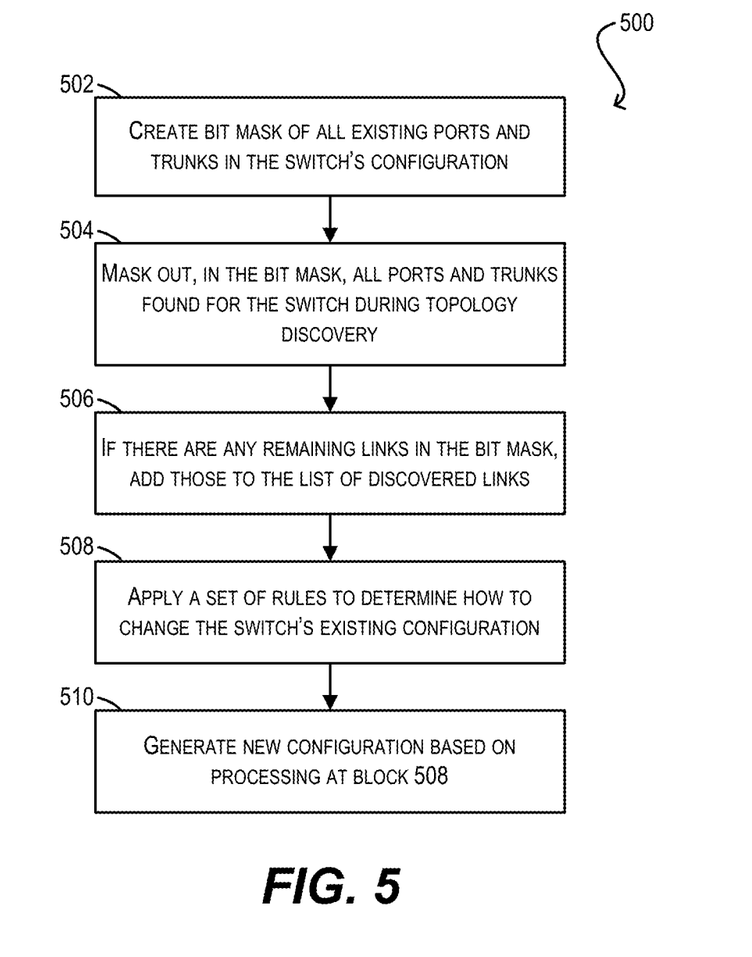
FIG. 5 depicts a flowchart for identifying and correcting errors in an existing trunking configuration according to an embodiment.

As discussed previously, in certain cases the existing trunking configuration for a stacking system may become inconsistent with the system's physical topology over time. For example, one or more switch units may be swapped in from a different system with a different configuration/topology, or one or more units in the system may be rearranged. In these cases, it can be extremely difficult to manually correct the configuration, since it can be difficult to pinpoint the consistencies (particularly in large and/or complex topologies). To address this, FIG. 5 depicts a flowchart 500 for automatically identifying and correcting errors in an existing trunking configuration according to an embodiment. In one embodiment, flowchart 500 can be performed by, e.g., each switch in the stacking system at the conclusion of (or during) the topology discovery process described with respect to FIGS. 3 and 4.

At block 502, the switch can create a bit mask of all of the existing ports and trunks in the switch's existing configuration. Further, at block 504, the switch can mask out, in the bit mask, all of the ports and trunks found for the switch during the topology discovery process. If there any remaining links in the bitmask, those links are added to the list of discovered links (block 506). Thus, blocks 502-506 essentially allow the switch to identify the discrepancies between the existing configuration and the discovered topology (i.e., which links are in the configuration but not in the topology, and vice versa).

At block 508, the switch can apply a set of rules to determine which of the determined discrepancies will result to a change in the switch's trunking configuration. In one set of embodiments, these rules can include the following:

On a peripheral unit, if a peripheral port is not a stacking trunk in the discovered topology but is a stacking trunk in the existing configuration, leave the port as a trunk in the final configuration.

If there is a stacking port or trunk in the existing configuration that is not found in the discovered topology, keep the stacking port/trunk in the final configuration (as long as it does not contradict the discovered topology).

If there is a stacking trunk in the existing configuration but the discovered topology uses the ports of the trunk in two different stacking links, remove the trunk from the final configuration.

On a core unit, if the existing configuration has a stacking trunk that is missing from the discovered topology and the missing trunk is not used in the discovered topology, keep the trunk in the final configuration.

Finally, at block 510, the switch can generate its new (i.e., final) trunking configuration based on the application of rules at block 508 and flowchart 500 can end.

6. Exemplary Network Switch

Figure 6:
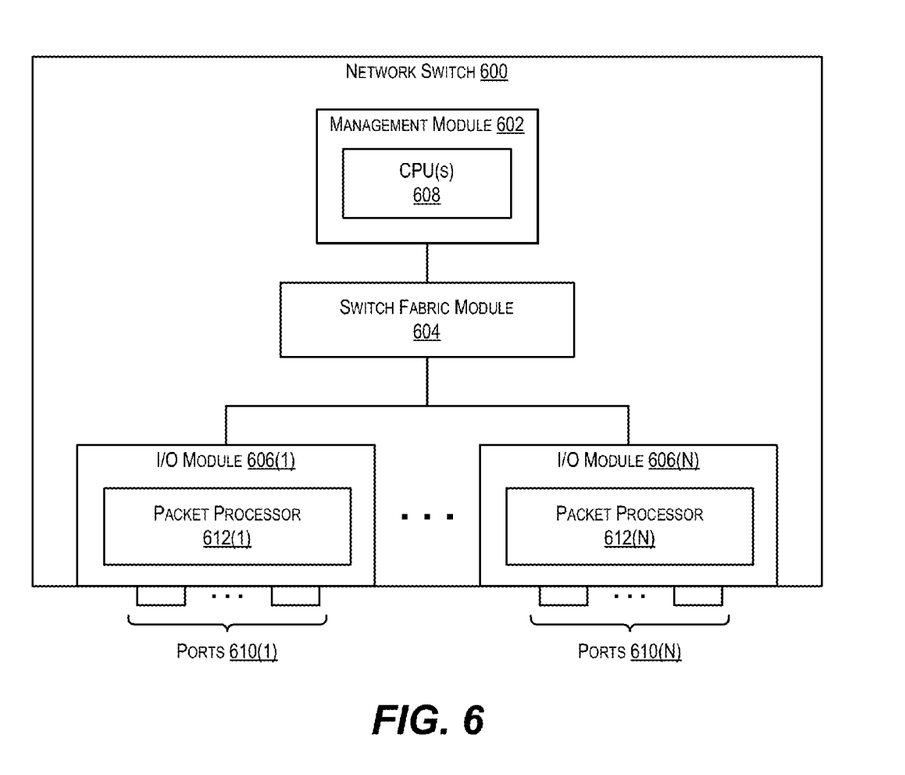
FIG. 6 depicts a network switch according to an embodiment.

FIG. 6 depicts an exemplary network switch 600 according to an embodiment. Network switch 600 can be used to implement any of the stackable switches described in the foregoing disclosure, such as switches 202-216 of FIG. 2.

As shown, network switch 600 includes a management module 602, a switch fabric module 604, and a number of I/O modules 606(1)-606(N). Management module 602 represents the control plane of network switch 600 and thus includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 604 and I/O modules 606(1)-606(N) collectively represent the data, or forwarding, plane of network switch 600. Switch fabric module 604 is configured to interconnect the various other modules of network switch 600. Each I/O module 606(1)-606(N) can include one or more input/output ports 610(1)-610(N) that are used by network switch 600 to send and receive data packets. As noted with respect to FIGS. 1A and 1B, ports 610(1)-610(N) can comprise data ports for communicating with hosts/other network devices, as well as stacking ports for communicating with other switch units in the same stacking system. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing data packets.

It should be appreciated that network switch 600 is illustrative and not intended to limit embodiments of the present invention. Many other configurations having more or fewer components than switch 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a switch in a stacking system, first and second control packets from one or more other switches in the stacking system, the first and second control packets being received on first and second stacking ports of the switch respectively; and
   determining, by the switch based on the first and second control packets, that there is an incorrect physical connection in a physical topology of the stacking system that prevents the first and second stacking ports from being configured as a single stacking trunk,
   wherein determining that there is an incorrect physical connection comprises determining that the first and second control packets were transmitted by different switches in the stacking system.

2. The method of claim 1 wherein the first and second control packets are discovery packets operable for discovering a physical topology of the stacking system.

3. The method of claim 1 wherein determining that there is an incorrect physical connection further comprises:
   determining that the first and second control packets were not transmitted from consecutively numbered source ports.

4. The method of claim 1 further comprising:
   generating an error that identifies a location of the incorrect physical connection.

5. The method of claim 4 wherein the error identifies a unit ID and a port number associated with the incorrect physical connection.

6. The method of claim 1 further comprising:
   creating a bit mask of all ports and trunks in an existing configuration for the switch;
   masking out, in the bit mask, ports and trunks found for the switch during physical topology discovery; and
   if there any remaining ports or trunks in the bit mask, adding the remaining ports and trunks to a list of port and trunks found for the switch during physical topology discovery.

7. The method of claim 6 further comprising:
   applying a set of rules for determining how to modify the switch's existing configuration to conform to the discovered physical topology.

8. The method of claim 7 wherein the set of rules includes a first rule indicating that, if the switch is a peripheral unit and if a peripheral port is not a stacking trunk in the discovered physical topology but is a stacking trunk in the existing configuration, the peripheral port should be left as a stacking trunk in the existing configuration.

9. The method of claim 8 wherein the set of rules further includes a second rule indicating that, if there is a stacking port or stacking trunk in the existing configuration that is not in the discovered physical topology, the stacking port or stacking trunk should be kept in the existing configuration.

10. The method the method of claim 9 wherein the set of rules further includes a third rule indicating that, if there is a stacking trunk in the existing configuration but the discovered physical topology uses the ports of the stacking trunk in two different stacking links, the stacking trunk should be removed from the existing configuration.

11. The method the method of claim 10 wherein the set of rules further includes a fourth rule indicating that, if the switch is a core unit, if the existing configuration includes a stacking trunk that is missing from the discovered physical topology, and if the missing stacking trunk is not used in the discovered physical topology, the stacking trunk should be kept in the existing configuration.

12. A non-transitory computer readable medium having stored thereon program code executable by a switch in a stacking system, the program code comprising:
   code that causes the switch to receive first and second control packets from one or more other switches in the stacking system, the first and second control packets being received on first and second stacking ports of the switch respectively; and
   code that causes the switch to determine, based on the first and second control packets, that there is an incorrect physical connection in a physical topology of the stacking system that prevents the first and second stacking ports from being configured as a single stacking trunk,
   wherein the code that causes the switch to determine that there is an incorrect physical connection comprises code that causes the switch to determine that the first and second control packets were transmitted by different switches in the stacking system.

13. A stackable switch comprising:
a plurality of stacking ports for communicatively coupling the stackable switch to other stackable switches in a stacking system;
a plurality of data ports;
a processor; and
a non-transitory computer readable medium having stored thereon executable program code which, when executed by the processor, causes the processor to:
receive, from the one or more of the other stackable switches, first and second control packets on first and second stacking ports in the plurality of stacking ports respectively; and
determine, based on the first and second control packets, that there is an incorrect physical connection in a physical topology of the stacking system that prevents the first and second stacking ports from being configured as a single stacking trunk,
wherein the program code that causes the processor to determine that there is an incorrect physical connection comprises program code that causes the processor to determine that the first and second control packets were transmitted by different stackable switches in the stacking system.

14. The non-transitory computer readable medium of claim 12 wherein the code that causes the switch to determine that there is an incorrect physical connection further comprises:
code that causes the switch to determine that the first and second control packets were not transmitted from consecutively numbered source ports.

15. The non-transitory computer readable medium of claim 12 further comprising:
code that causes the switch to generate an error that identifies a location of the incorrect physical connection.

16. The non-transitory computer readable medium of claim 15 wherein the error identifies a unit ID and a port number associated with the incorrect physical connection.

17. The stackable switch of claim 13 wherein the program code that causes the processor to determine that there is an incorrect physical connection further comprises program code that causes the processor to:
determine that the first and second control packets were not transmitted from consecutively numbered source ports.

18. The stackable switch of claim 13 where the program code further causes the processor to:
generate an error that identifies a location of the incorrect physical connection.

19. The stackable switch of claim 18 wherein the error identifies a unit ID and a port number associated with the incorrect physical connection.

* * * * *